United States Patent
Shim et al.

(10) Patent No.: US 9,354,301 B2
(45) Date of Patent: May 31, 2016

(54) METHOD AND APPARATUS FOR ULTRASOUND DIAGNOSIS THAT REDUCES INTERFERENCE AND RESTORES MISSED SIGNALS

(75) Inventors: Hwan Shim, Yongin-si (KR); Young-Tae Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 613 days.

(21) Appl. No.: 13/493,464

(22) Filed: Jun. 11, 2012

(65) Prior Publication Data

US 2012/0316444 A1 Dec. 13, 2012

Related U.S. Application Data

(60) Provisional application No. 61/495,562, filed on Jun. 10, 2011.

(30) Foreign Application Priority Data

Dec. 16, 2011 (KR) ........................ 10-2011-0136556

(51) Int. Cl.
*A61B 8/00* (2006.01)
*G01S 7/52* (2006.01)
*G01S 15/89* (2006.01)

(52) U.S. Cl.
CPC ......... *G01S 7/52077* (2013.01); *G01S 7/52023* (2013.01); *G01S 7/52026* (2013.01); *G01S 15/8979* (2013.01)

(58) Field of Classification Search
USPC ................................ 600/407, 437, 453–457
See application file for complete search history.

(56) References Cited

U.S. PATENT DOCUMENTS

| 5,642,732 | A | 7/1997 | Wang | |
|---|---|---|---|---|
| 6,642,732 | B2 * | 11/2003 | Cowan et al. | 324/750.11 |
| 2009/0012398 | A1 * | 1/2009 | Zhang et al. | 600/453 |

OTHER PUBLICATIONS

Serbes et al (Modified dual tree complex wavelet transform for processing quadrature signals, Biomedical signal processing control (Jun. 2011) 301-306); received Apr. 30, 2010.*

* cited by examiner

*Primary Examiner* — Joel F Brutus
(74) *Attorney, Agent, or Firm* — Sughrue Mion, PLLC

(57) ABSTRACT

A method and apparatus for ultrasound diagnosis that reduces interference and restores missed signals, is provided. The method of ultrasound diagnosis includes operations of receiving a Doppler signal having at least one gap; respectively obtaining model parameter sets of first and second Doppler signals by using Doppler signal periods before and after a start of the at least one gap; synthesizing first and second Doppler information by respectively using the model parameter sets of the first and second Doppler signals; and generating Doppler information for the at least one gap by cross-fading the synthesized first and second Doppler information. The apparatus includes a transformer for transforming received I and Q signals into stereo audio signals using a Hilbert transform; and a source separator which removes interference from the stereo audio signals by performing source separation on the stereo audio signals.

12 Claims, 6 Drawing Sheets

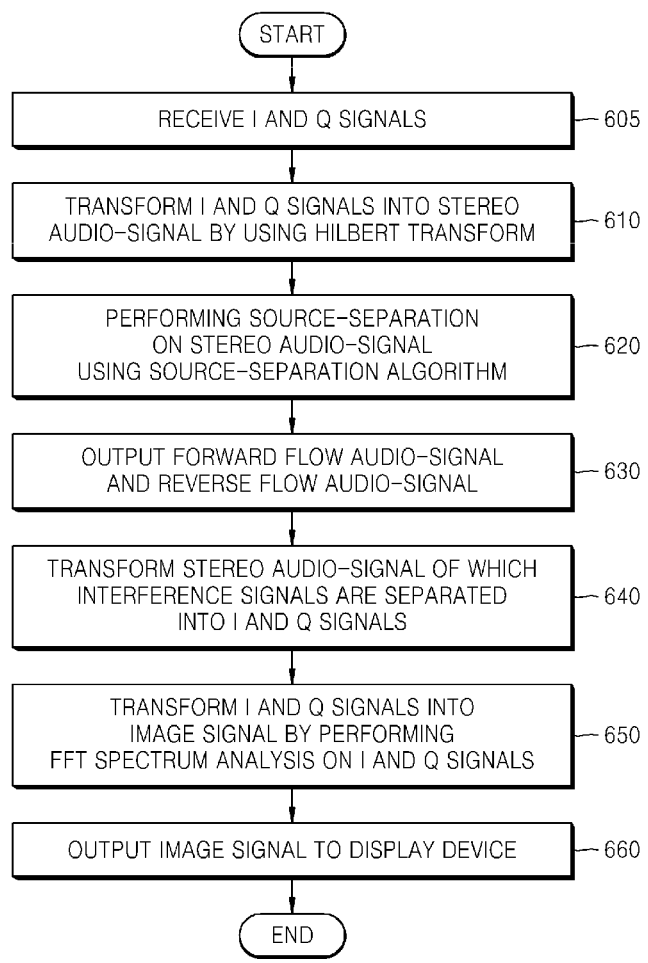

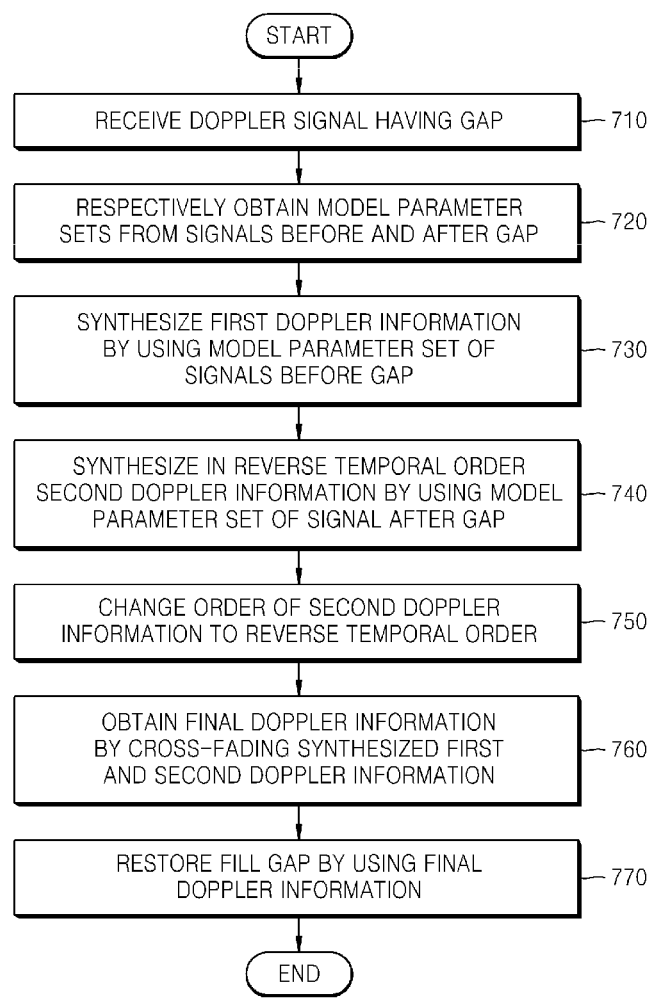

METHOD AND APPARATUS FOR ULTRASOUND DIAGNOSIS THAT REDUCES INTERFERENCE AND RESTORES MISSED SIGNALS

CROSS-REFERENCE TO RELATED PATENT APPLICATION

This application claims the benefit of U.S. Provisional Patent Application No. 61/495,562, filed on Jun. 10, 2011, in the U.S. Patent and Trademark Office, and the benefit of Korean Patent Application No. 10-2011-0136556, filed on Dec. 16, 2011, in the Korean Intellectual Property Office, the disclosures of which are incorporated herein their entireties by reference.

BACKGROUND

1. Field

The present inventive concept relates to an ultrasound diagnosis system, and more particularly, to a method and apparatus for ultrasound diagnosis that reduces interference and restores missed signals.

2. Description of the Related Art

Ultrasound diagnosis is a medical technology for imaging the inner structure of the human body by using ultrasound that is projected to and reflected from the human body. The ultrasound has a frequency of 2 through 20 MHz, which is inaudible to humans. Because reflectance of the ultrasound varies at an interface of two different materials, the ultrasound may produce an image.

An ultrasound diagnosis apparatus uses stereo-audio processing technology and gap filling processing technology.

The stereo-audio processing technology involves transforming an in-phase (I) signal and a quadrature phase (Q) signal into a stereo audio-signal by performing a Hilbert transformation. The stereo audio-signal means a forward flow audio-signal and a reverse flow audio-signal.

However, according to the related art, due to a problem of an analog device, when interference occurs between the I signal and the Q signal, it is not possible to remove an interference signal.

The gap filling processing technology involves restoring a gap portion by using before and after signals of the gap portion.

However, in the gap filling processing technology according to the related art, an image may have a defect due to a mismatch between real data and synthesized data at an end of the gap portion.

SUMMARY

The present inventive concept provides an ultrasound diagnosis apparatus and method that reduce interference between a forward flow audio-signal and a reverse flow audio-signal.

The present inventive concept also provides an ultrasound diagnosis apparatus and method that restore missed signals of a gap portion.

According to an exemplary embodiment of the present inventive concept, there is provided an ultrasound diagnosis method that restores missed signals. The ultrasound diagnosis method including operations of receiving a Doppler signal having at least one gap; respectively obtaining model parameter sets of first and second Doppler signals by using Doppler signal periods before and after a start of the at least one gap; synthesizing first and second Doppler information by using the model parameter sets of the first and second Doppler signals, respectively; and generating Doppler information for the at least one gap by cross-fading the synthesized first and second Doppler information.

The Doppler signal may be formed of Doppler I and Q signals.

The Doppler signal may be a Doppler complex signal obtained by adding a Q signal that is phase-shifted by 90 degree and an I signal.

The Doppler signal may be characterized by a magnitude and a phase of a Doppler complex signal obtained by adding a Q signal that is phase-shifted by 90 degree and an I signal, or by subtracting the I signal from the Q signal.

The operation of obtaining the model parameter sets may include operations of obtaining the model parameter set of the first Doppler signal by using the Doppler signal period before the start of the at least one gap; and obtaining the model parameter set of the second Doppler signal by using the Doppler signal period after an end of the at least one gap.

The Doppler information may be artificial Doppler data.

The Doppler information may be spectral information.

Each of the model parameter sets may be an autoregressive (AR) model.

Each of the model parameter sets may be an infinite impulse response (IIR) filter.

The operation of synthesizing the first and second Doppler information may include operations of synthesizing the first Doppler information by using the model parameter set of the first Doppler signal before the start of the at least one gap; synthesizing the second Doppler information in a reverse temporal order by using the model parameter set of the second Doppler signal after an end of the at least one gap; and changing the reverse temporal order of the second Doppler information to a reverse temporal order.

According to an exemplary embodiment of the present inventive concept, there is provided a method of ultrasound diagnosis that reduces interference, the ultrasound diagnosis method including operations of transforming a Doppler signal into a forward flow audio-signal and a reverse flow audio-signal; separating interference signals mixed in the forward flow and reverse flow audio-signals via a source separation process; and generating forward flow and reverse flow audio-signals from which the interference signals are separated.

The ultrasound diagnosis method may further include an operation of generating an image signal by performing a spectrum-analysis on the forward flow and reverse flow audio-signals from which the interference signals are separated.

The operation of generating the image signal may include operations of transforming the forward flow and reverse flow audio-signals from which the interference signals are separated into the Doppler signal; and generating the image signal by performing the spectrum-analysis on the Doppler signal.

The spectrum-analysis may be a fast Fourier transform (FFT) or a discrete Fourier transform (DFT).

The Doppler signal may be formed of Doppler I and Q signals.

The source separation process may be performed by separating a reverse flow audio component that is mixed in the forward flow audio-signal from the forward flow audio-signal and by separating a forward flow audio component that is mixed in the reverse flow audio-signal from the reverse flow audio-signal.

The source separation process may be a principal component analysis.

According to an exemplary embodiment of the present inventive concept, there is provided an ultrasound diagnosis apparatus that restores missed signals, the ultrasound diagnosis apparatus including a model parameter extractor which receives a Doppler signal having a gap and for respectively extracting model parameter sets of first and second Doppler signals by using Doppler signal periods before and after a start of the gap; a Doppler synthesizer which synthesizes first Doppler information and second Doppler information by respectively using the model parameter sets of the first and second Doppler signals that are extracted by the model parameter extractor; and a cross-fader which generates generating Doppler information for a period of the gap by cross-fading the first and second Doppler information synthesized by the Doppler synthesizer.

The model parameter extractor may be an autoregressive (AR) processor.

According to another exemplary embodiment of the present inventive concept, there is provided an ultrasound diagnosis apparatus that reduces interference; the ultrasound diagnosis apparatus including a signal transformer which transforms a Doppler signal into a forward flow audio-signal and a reverse flow audio-signal; a source separator which separates interference signals mixed in the forward flow and reverse flow audio-signals; and an image processor which generates an image signal by performing a spectrum-analysis on the forward flow and reverse flow audio-signals from which the interference signals are separated by the source separator.

The source separator may separate interference signals that are mixed in audio signals in one channel from the audio signals.

The image processor may include a signal transformer which transforms the forward flow and reverse flow audio-signals from which the interference signals are separated by the source separator into the Doppler signal; and a spectrum analyzer which generates the image signal by performing the spectrum-analysis on the Doppler signal that is transformed by the signal transformer.

The image processor may include an apparatus for ultrasound diagnosis including a transformer for transforming received I and Q signals into stereo audio signals; and a source separator which removes interference from the stereo audio signals by performing source separation on the stereo audio signals. The I and Q signals may be transformed by using a Hilbert transform and the source separation may be performed by using a source separation algorithm.

BRIEF DESCRIPTION OF THE DRAWINGS

The above and other features and advantages of the present inventive concept will become more apparent by describing in detail exemplary embodiments thereof with reference to the attached drawings in which:

FIG. 6 is a flowchart of a method of ultrasound diagnosis that reduces interference, according to another exemplary embodiment of the present inventive concept; and FIG. 7 is a flowchart of an ultrasound diagnosis method that restores missed signals, according to an exemplary embodiment of the present inventive concept.

DETAILED DESCRIPTION

Figure 1:
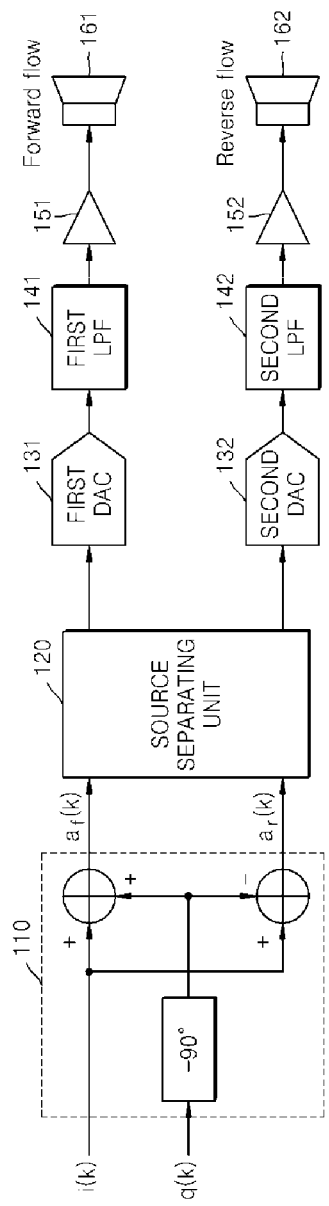
FIG. 1 is a block diagram of an ultrasound diagnosis apparatus that reduces interference according to an exemplary embodiment of the present inventive concept.

Hereinafter, the present inventive concept will be described in detail by explaining exemplary embodiments with reference to the attached drawings. In order to avoid redundant descriptions, like reference numerals in the drawings denote like elements having the same functions.

FIG. 1 is a block diagram of an ultrasound diagnosis apparatus that reduces interference according to an exemplary embodiment of the present inventive concept.

The ultrasound diagnosis apparatus of FIG. 1 includes a signal transforming unit 110, a source separating unit 120, first and second digital analog converters (first and second DACs) 131 and 132, first and second low pass filters (LPFs) 141 and 142, first and second amplifiers 151 and 152, and first and second speakers 161 and 162.

An ultrasound signal reflected from a target object is transformed into a focused radio frequency (focused RF) signal via a predetermined module. The focused RF signal is transformed and demodulated into a baseband Doppler signal via a high pass filter (HPF) (not shown), cosine and sine functions, and an LPF (not shown).

The Doppler signal includes an I(k) signal including an in-phase component, and a Q(k) signal including a quadrature phase component.

The signal transforming unit 110 transforms the Doppler signal into a forward flow audio-signal and a reverse flow audio-signal.

The signal transforming unit 110 may perform the signal transformation by using a Hilbert transform, but the type of signal transformation is not limited thereto.

That is, the signal transforming unit 110 that uses the Hilbert transform generates a forward flow audio-signal $a_f(k)$ by adding the Q(k) signal that is phase-shifted by 90 degrees and the I(k) signal, and generates a reverse flow audio-signal $a_r(k)$ by subtracting the I(k) signal from the Q(k) signal that is phase-shifted by 90 degrees.

The source separating unit 120 separates interference signals from the forward flow audio-signal $a_f(k)$ and the reverse flow audio-signal $a_r(k)$ that are generated by the signal transforming unit 110, and thus, generates the forward flow audio-signal $a_f(k)$ and the reverse flow audio-signal $a_r(k)$ that do not include the interference signals. The source separation is performed by using a technology for separating an interference signal and an original signal from a mixed signal of one channel. For example, the source separation may be performed by using a Principal Component Analysis (PCA) or an Independent Component Analysis (ICA), but the type of source separation is not limited thereto.

The source separation will now be further described.

If the forward flow audio-signal is af(k) and the reverse flow audio-signal is ar(k), af(k) and ar(k) may be defined as in the equations below.

$$a_f(k) = a_f + q_1 \cdot a_{r1}$$

$$a_r(k) = a_r + q_2 \cdot a_{f1}$$

where, $a_f$ and $a_r$ indicate a desired forward flow audio-signal and a desired reverse flow audio-signal, respectively; $a_{r1}$ indicates a reverse flow audio-signal mixed in a forward flow audio-signal, $a_{f1}$ indicates a forward flow audio-signal mixed in a reverse flow audio-signal, and $q_1$ and $q_2$ are mixing ratio values.

Thus, the source separating unit 120 removes $q_1 \cdot a_{r1}$ and $q_2 \cdot a_{f1}$, which correspond to interference signals, from $a_f(k)$ and $a_r(k)$, and extracts only $a_f$ and $a_r$ that correspond, respectively, to the desired forward flow audio-signal and the desired reverse flow audio-signal.

Referring back to FIG. 1, the first and second DACs 131 and 132 convert the forward flow audio-signal and the reverse flow audio-signal from which interference signals are removed by the source separating unit 120 into an analog forward flow audio-signal and an analog reverse flow audio-signal.

The first and second LPFs 141 and 142 low pass filter the analog forward flow audio-signal and the analog reverse flow audio-signal that are output from the first and second DACs 131 and 132, and then extract a forward flow audio-signal and a reverse flow audio-signal that have low band components.

The first and second amplifiers 151 and 152 amplify the forward flow audio-signal and the reverse flow audio-signal that are extracted by the first and second LPFs 141 and 142.

The first and second speakers 161 and 162 reproduce the forward flow audio-signal and the reverse flow audio-signal that are amplified by the first and second amplifiers 151 and 152.

According to the present exemplary embodiment, interference between the forward flow audio-signal and the reverse flow audio-signal is reduced, so that a left and right separation level with respect to a stereo audio-signal may be increased.

Figure 2:
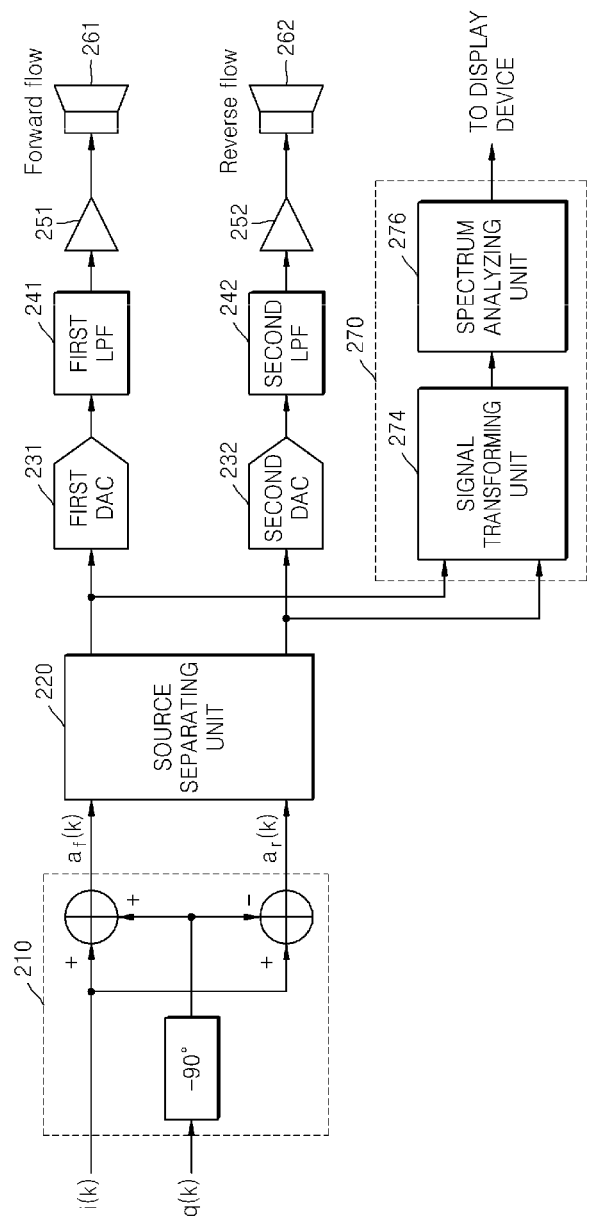
FIG. 2 is a block diagram of an ultrasound diagnosis apparatus that reduces interference according to another exemplary embodiment of the present inventive concept.

FIG. 2 is a block diagram of an ultrasound diagnosis apparatus that reduces interference according to another exemplary embodiment of the present inventive concept.

The ultrasound diagnosis apparatus of FIG. 2 includes a signal transforming unit 210, a source separating unit 220, first and second DACs 231 and 232, first and second LPFs 241 and 242, first and second amplifiers 251 and 252, first and second speakers 261 and 262, and an image processing unit 270. The image processing unit 270 is formed of a signal transforming unit 274 and a spectrum analyzing unit 276.

First, the signal transforming unit 210, the source separating unit 220, the first and second DACs 231 and 232, the first and second LPFs 241 and 242, the first and second amplifiers 251 and 252, and the first and second speakers 261 and 262 perform substantially the same functions as the signal transforming unit 110, the source separating unit 120, the first and second DACs 131 and 132, the first and second LPFs 141 and 142, the first and second amplifiers 151 and 152, and the first and second speakers 161 and 162 of FIG. 1, respectively, and thus, detailed descriptions thereof are omitted here.

The image processing unit 270 analyzes a spectrum from a forward flow audio-signal and a reverse flow audio-signal from which interference signals are removed by the source separating unit 220, and then generates an image signal.

The image processing unit 270 is formed of the signal transforming unit 274 and the spectrum analyzing unit 276.

The signal transforming unit 274 transforms the forward flow audio-signal and the reverse flow audio-signal of which interference signals are removed by the source separating unit 220 into I and Q signals. The signal transforming unit 274 may use a Hilbert Transform but is not limited to this type of a transformer.

The spectrum analyzing unit 276 analyzes the spectrum by using the I and Q signals transformed by the signal transforming unit 274, and then generates the image signal. The spectrum analyzing unit 276 may use a fast Fourier transform (FFT) spectrum analyzer or a discrete Fourier transform (DFT) analyzer, but is not limited to this type of analyzer.

The image signal generated by the image processing unit 270 is output to a display device and is displayed on a screen.

According to the present exemplary embodiment, interference between the forward flow audio-signal and the reverse flow audio-signal is reduced, so that a signal to noise ratio (SNR) of the image signal may be increased.

Figure 3:
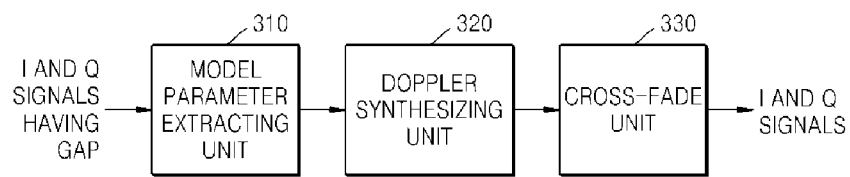
FIG. 3 is a block diagram of an ultrasound diagnosis apparatus that restores missed signals, according to an exemplary embodiment of the present inventive concept.

FIG. 3 is a block diagram of an ultrasound diagnosis apparatus that restores missed signals, according to an exemplary embodiment of the present inventive concept.

Before describing a structure of the ultrasound diagnosis apparatus for restoring missed signals, a Doppler spectrum including a gap will first be described.

In general, an ultrasound apparatus provides brightness and a Doppler (BD)-mode image that displays a flow of a bloodstream or movement of a target object, by using the Doppler effect.

That is, the ultrasound apparatus simultaneously provides a B-mode image having a grayscale, and a D-mode image which corresponds to a sample volume that is set in the B-mode image. The D-mode image indicates movement direction and speed information regarding a moving object or a blood vessel.

In order to form the BD-mode image, the ultrasound apparatus alternately transmits and receives a first ultrasound beam used to obtain the B-mode image, and a second ultrasound beam used to obtain the D-mode image.

Figure 4:
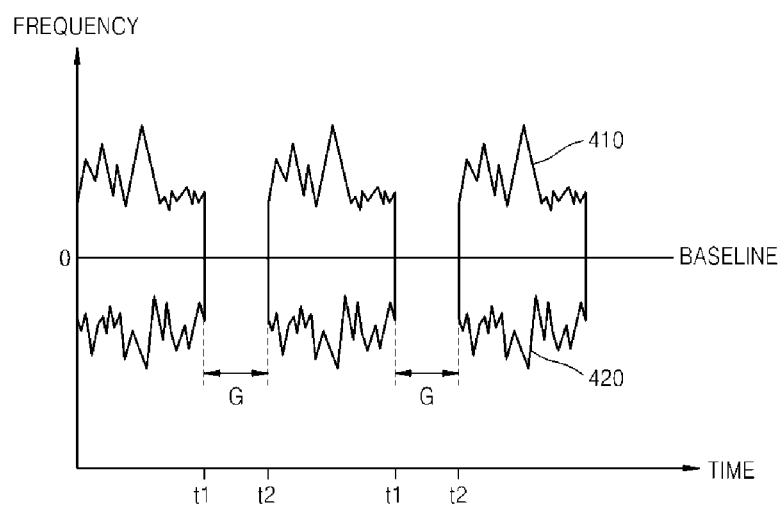
FIG. 4 illustrates a Doppler spectrum including a gap generated by the ultrasound diagnosis apparatus of FIG. 3.

The ultrasound apparatus transmits and receives the first ultrasound beam for a predetermined time period, and then transmits and receives the second ultrasound beam for a predetermined time period. In this regard, the ultrasound apparatus cannot transmit and receive the second ultrasound beam while the ultrasound apparatus transmits and receives the first ultrasound beam. As a gap G occurs in the D-mode image as shown in FIG. 4. In a Doppler spectrum of FIG. 4, an X-axis indicates a time, a Y-axis indicates a frequency, reference numeral 410 indicates a forward flow spectrum, and reference numeral 420 indicates a reverse flow spectrum.

Referring back to FIG. 3, the ultrasound diagnosis apparatus includes a model parameter extracting unit 310, a Doppler synthesizing unit 320, and a cross-fade unit 330.

First, the ultrasound diagnosis apparatus receives a Doppler signal having at least one gap. The Doppler signal is formed of Doppler I and Q signals. In particular, the Doppler signal indicates a Doppler complex signal formed by adding the Q signal that is phase-shifted by 90 degree and the I signal. Specifically, the Doppler signal indicates a magnitude and a phase of the Doppler complex signal obtained by adding the Q signal that is phase-shifted by 90 degrees with the I signal.

When the Doppler signal having at least one gap is received, the model parameter extracting unit 310 extracts a model parameter set of a first Doppler signal by using a partial period of the Doppler signal before a start of the gap, and extracts a model parameter set of a second Doppler signal by using a partial period of the Doppler signal after an end of the gap.

The model parameter extracting unit 310 may use an autoregressive (AR) model processor or an infinite impulse response (IIR) filter but the type of model parameter set is not limited thereto. Accordingly, the model parameter set may be an AR model parameter set or an IIR filter parameter set. Also, the AR model parameter set may be extracted by using one of known methods including a Burg algorithm, a Yule-Walker algorithm, and the like.

The Doppler synthesizing unit 320 synthesizes first Doppler information by using the model parameter set of the first Doppler signal, and synthesizes second Doppler information by using the model parameter set of the second Doppler signal, wherein the model parameter sets are extracted by the model parameter extracting unit 310. The first Doppler information and the second Doppler information correspond to prediction signals for a gap filling operation. Also, the first Doppler information and the second Doppler information are artificial Doppler data or spectral information.

The cross-fade unit 330 fills a period of the gap by cross-fading the first Doppler information and the second Doppler information that are synthesized by the Doppler synthesizing unit 320.

Thus, according to the present exemplary embodiment, the gap is filled by using signal periods before and after the gap, so that real data and synthesized data may be smoothly connected.

Figure 5:
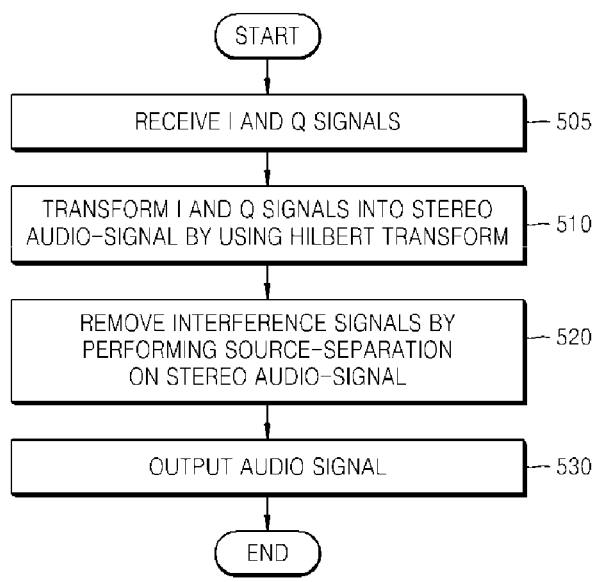
FIG. 5 is a flowchart of a method of ultrasound diagnosis that reduces interference, according to an exemplary embodiment of the present inventive concept.

FIG. 5 is a flowchart of an ultrasound diagnosis method that reduces interference, according to an exemplary embodiment of the present inventive concept.

First, Doppler I and Q signals are received (operation 505).

Afterward, the Doppler I and Q signals are transformed into a stereo audio-signal by using the Hilbert transform (operation 510). Here, the stereo audio-signal is formed of a forward flow audio-signal and a reverse flow audio-signal.

Then, source-separation is performed on the stereo audio-signal by using a predetermined source separation algorithm, so that interference signals mixed in the stereo audio-signal are removed (operation 520).

For example, a reverse flow audio component that is mixed in the forward flow audio-signal is separated from the forward flow audio-signal, and a forward flow audio component that is mixed in the reverse flow audio-signal is separated from the reverse flow audio-signal.

By doing so, a final stereo audio-signal from which interference signals that have been mixed in the stereo audio-signal are removed is output (operation 530).

FIG. 6 is a flowchart of an ultrasound diagnosis method that reduces interference, according to another exemplary embodiment of the present inventive concept.

First, Doppler I and Q signals are received (operation 605).

Afterward, the Doppler I and Q signals are transformed into a stereo audio-signal by using the Hilbert transform (operation 610). The stereo audio-signal is formed of a forward flow audio-signal and a reverse flow audio-signal.

Then, source-separation is performed on the stereo audio-signal by using a predetermined source separation algorithm, so that interference signals mixed in the stereo audio-signal are removed (operation 620).

Afterward, a final stereo audio-signal (a forward flow audio-signal and a reverse flow audio-signal) from which interference signals that have been mixed in the stereo audio-signal are removed is output (operation 630).

Afterward, a spectrum of the source-separated stereo audio-signal is analyzed and then the source-separated stereo audio-signal is transformed into an image signal (operations 640 and 650). For example, the source-separated stereo audio-signal of which interference signals are separated are transformed into the Doppler I and Q signals (operation 640).

Then, an FFT spectrum analysis is performed on the transformed signals, so that the transformed I and Q signals are transformed into the image signal (operation 650).

Finally, the image signal is output to a display device (operation 660).

FIG. 7 is a flowchart of an ultrasound diagnosis method that restores missed signals, according to an exemplary embodiment of the present inventive concept.

First, a Doppler signal having at least one gap is received (operation 710). Here, the Doppler signal means Doppler I and Q signals.

Afterward, a model parameter set of a first Doppler signal is obtained by using a portion of the Doppler signal before a start of the gap, and a model parameter set of a second Doppler signal is obtained by using a portion of the Doppler signal after an end of the gap (operation 720). That is, model parameters that correspond to prediction signals are generated by using AR modeling and an IIR filter.

Afterward, first Doppler information is synthesized by using the model parameter set of the first Doppler signal before the start of the gap (operation 730).

Then, second Doppler information is synthesized in a reverse temporal order by using the model parameter set of the second Doppler signal after the end of the gap (operation 740).

Afterward, the reverse temporal order of the second Doppler information is changed to a reverse temporal order (operation 750).

Afterward, the first and second Doppler information are cross-faded, so that final Doppler information is obtained (operation 760).

Finally, the gap is filled by using the cross-faded final Doppler information (operation 770).

The exemplary embodiments of the present inventive concept can be written as computer programs and can be implemented in general-use digital computers that execute the programs using a computer readable recording medium. In addition, a data structure used in the embodiments of the present inventive concept can be written in a computer readable recording medium through various means. Examples of the computer readable recording medium include magnetic storage media (e.g., ROM, floppy disks, hard disks, etc.), optical recording media (e.g., CD-ROMs, or DVDs), etc.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of ultrasound diagnosis that restores missed signals, the method being performed by an apparatus for ultrasound diagnosis and comprising:

receiving by the apparatus for ultrasound diagnosis, a Doppler signal having at least one gap;

obtaining by the apparatus for ultrasound diagnosis, a model parameter set of a first Doppler signal by using a period of the received Doppler signal before the at least one gap and obtaining by the apparatus for ultrasound diagnosis, a model parameter set of a second Doppler signal by using a period of the received Doppler signal after the at least one gap;

synthesizing by the apparatus for ultrasound diagnosis, first Doppler information by using the model parameter set of the first Doppler signal before the at least one gap and synthesizing by the apparatus for ultrasound diagnosis, second Doppler information in a reverse temporal order by using the model parameter set of the second Doppler signal after the at least one gap;

changing by the apparatus for ultrasound diagnosis, a temporal order of the second Doppler information to a reverse temporal order; and generating by the apparatus for ultrasound diagnosis, Doppler information for filling the at least one gap by cross-fading the synthesized first Doppler information and the synthesized second Doppler information having the changed temporal order, wherein the synthesized first Doppler information and the synthesized second Doppler information are artificial Doppler data.

2. The ultrasound diagnosis method of claim 1, wherein the Doppler signal is formed of Doppler I and Q signals.

3. The ultrasound diagnosis method of claim 1, wherein the Doppler signal is a Doppler complex signal obtained by adding a Q signal that is phase-shifted by 90 degree and an I signal.

4. The ultrasound diagnosis method of claim 1, wherein the Doppler signal is characterized by a magnitude and a phase of a Doppler complex signal obtained by adding a Q signal that is phase-shifted by 90 degree and an I signal or by subtracting the I signal from the Q signal.

5. The ultrasound diagnosis method of claim 1, wherein the model parameter set of the first Doppler signal is obtained by using the period of the Doppler signal before a start of the at least one gap and the model parameter set of the second Doppler signal is obtained by using the period of the Doppler signal after an end of the at least one gap.

6. The ultrasound diagnosis method of claim 1, wherein the Doppler information is spectral information.

7. The ultrasound diagnosis method of claim 1, wherein each of the model parameter sets is an autoregressive (AR) model.

8. The ultrasound diagnosis method of claim 1, wherein each of the model parameter sets is an infinite impulse response (IIR) filter.

9. The ultrasound diagnosis method of claim 1, wherein the first Doppler information is synthesized by using the model parameter set of the first Doppler signal before a start of the at least one gap; and the second Doppler information is synthesized in reverse temporal order by using the model parameter set of the second Doppler signal after an end of the at least one gap and the method further comprises changing the reverse temporal order of the second Doppler information to a reverse temporal order.

10. A non-transitory computer-readable recording medium having recorded thereon a program, wherein the program when executed by a processor of a computer, performs the receiving of the Doppler signal, the obtaining of the model parameter set of the first Doppler signal and the obtaining of the model parameter set of the second Doppler signal, the synthesizing of the first Doppler information, the synthesizing of the second Doppler information and the generating of the Doppler information of the method of claim 1.

11. An apparatus for ultrasound diagnosis that restores missed signals, the apparatus comprising:

a model parameter extractor which receives a Doppler signal having a gap and extracts a model parameter set of a first Doppler signal by using a period of the received Doppler signal before the gap and a model parameter set of a second Doppler signal by using a period of the received Doppler signal after the gap;

a Doppler synthesizer which synthesizes first Doppler information by using the extracted model parameter set of the first Doppler signal before the gap and synthesizes second Doppler information in a reverse temporal order by using the extracted model parameter set of the second Doppler signal after the gap and changes by the apparatus for ultrasound diagnosis, a temporal order of the second Doppler information to a reverse temporal order; and a cross-fader which generates Doppler information for filling the gap by cross-fading the synthesized first Doppler information and the synthesized second Doppler information having the changed temporal order, wherein the synthesized first Doppler information and the synthesized second Doppler information are artificial Doppler data.

12. The ultrasound diagnosis apparatus of claim 11, wherein the model parameter extractor is an autoregressive (AR) processor.

* * * * *